United States Patent [19]

Clinard, Jr.

[11] 4,108,508

[45] Aug. 22, 1978

[54] FRUSTROCONICAL LAMINATED BEARING

[75] Inventor: Ralph L. Clinard, Jr., Erie, Pa.

[73] Assignee: Lord Corporation, Erie, Pa.

[21] Appl. No.: 764,667

[22] Filed: Feb. 1, 1977

[51] Int. Cl.$^2$ ............................................. F16F 1/38
[52] U.S. Cl. ............................. 308/238; 267/57.1 R;
416/134 A; 416/141
[58] Field of Search ...................... 267/57.1 R, 63 R;
308/26, 28, 238; 416/102, 134–141

[56] References Cited

U.S. PATENT DOCUMENTS

| 2,482,488 | 9/1949 | Julien | 267/57.1 R X |
| 2,900,182 | 8/1959 | Hinks | 267/57.1 R |
| 3,179,400 | 4/1965 | Krotz | 267/57.1 R |
| 3,652,185 | 3/1972 | Cresap et al. | 416/134 |

OTHER PUBLICATIONS

Aviation Week & Space Technology, Nov. 23, 1970, p. 51.

Primary Examiner—Stephen G. Kunin
Attorney, Agent, or Firm—Maurice R. Salada

[57] ABSTRACT

A laminated bearing comprises a plurality of alternating and bonded together layers of elastomeric material and substantially nonextensible material. Each of the layers is a frustroconically shaped annulus that has a pair of frustroconically shaped side surfaces and is concentrically disposed about a common axis extending lengthwise of the bearing. The side surfaces of adjacent layers are bonded to each other such that the larger diameter end of each layer is disposed adjacent to the larger diameter end of another layer. Together, the larger diameter ends of the layers define an annular surface of the bearing. The annular surface formed by the ends of the layers defines, in radial section, an angle with respect to a line which lies normal to the side surfaces of the layers. The direction of the angle or inclination, with respect to the normal line, is toward the smaller diameter ends of the layers with increasing distance along the normal line away from the common axis. Preferably, the angle is about 9°.

6 Claims, 6 Drawing Figures

FRUSTROCONICAL LAMINATED BEARING

BACKGROUND OF THE INVENTION

The compressive load carrying capacity of a layer of resilient material may be increased several hundred percent by incorporating a plurality of spaced, parallel laminae fabricated nonextensible material and oriented generally perpendicular to the direction of the anticipated compressive load. The laminae increase the compressive load carrying capacity of the resilient material by reducing the ability of the material to deflect or bulge in directions transverse to the direction of the compressive load. At the same time, the ability of the resilient material to yield in shear or in torsion in directions parallel to the laminations or transverse to the direction of the compressive load is substantially unaffected. The characteristics of such laminated resilient material have resulted in the commercial acceptance for a variety of applications of bearings incorporating laminated material. One area of particular importance is the mounting of helicopter rotor blades on an associated rotor hub.

In some mechanical designs, a bearing must be able to deflect in response to rotational loads or forces and be able to support, without significant deflection, compressive loads applied in a single, known direction. A cylindrical, laminated resilient bearing can provide the required characteristics. Within such a cylindrical laminated bearing, the individual layers or laminations may be either disc-like or tubular in shape. A laminated bearing with disc-like laminations can resist or support compressive loads applied parallel to the axis of rotational loading, which passes through the centers of the discs. With tubular laminations, a laminated bearing can resist or support loads applied radially or perpendicularly relative to the axis of rotational loading.

In other mechanical designs, a bearing must be able to resist or support compressive loads applied in two or more generally perpendicular directions, while also being able to deflect in response to rotational loads. Such requirements can be met by a laminated resilient bearing that is frustroconical in shape and has layers or laminations which are also frustroconical in shape. (Such a frustroconically shaped bearing is to be distinguished from a laminated bearing which has an overall frustroconical shape, but in which the layers or laminations are tubular, for example, and are merely displaced axially relative to one another in order to provide the overall frustroconical shape of the bearing.) The use of a frustroconically shaped laminated bearing to resist or support compressive loads applied in two or more generally perpendicular directions, while being free to deflect in response to rotational loads, is shown in patents such as: Hinks U.S. Pat. No. 2,900,182; Krotz U.S. Pat. No. 3,179,400; Cresap et al U.S. Pat. No. 3,652,185; and Gorndt et al U.S. Pat. No. 3,862,812. A method of manufacturing a frustroconical laminated bearing is described and illustrated in Galbato U.S. Pat. No. 3,503,820.

When frustroconically shaped laminated bearings are utilized in automobile suspensions, such as are described and illustrated in the Hinks and Krotz patents, for example, the bearings are subjected to moderate compressive loads. When used to mount helicopter rotor blades to a rotor hub, as described and illustrated in the Cresap et al and Gorndt et al patents, on the other hand, the laminated frustroconical bearings are subjected to significantly more severe compressive loads, in the range of 50,000 to 100,000 pounds. To accommodate the higher compressive loads, one alternative is to build larger, more massive bearings. Such an approach becomes less and less acceptable, however, as the technology involved in the construction of helicopters advances and produces increased demands, in terms of still higher loads and prolonged service life, on bearings used in helicopters. In addition, efforts to improve fuel economy, for example, have increased the desirability of reducing the size and weight of all components of a helicopter.

As the operating loads have increased on laminated bearings utilized in helicopter rotor blade retention systems, it has become increasingly common to see a type of bearing failure in which the resilient or elastomeric material extrudes from between adjacent rigid or nonextensible laminations. In investigating such bearing failures, it has been found that when large compressive loads are applied to a laminated bearing, unusually large shear strains may be produced at the edges of the layers of resilient or elastomeric material. The shear strains result from unexpectedly high, localized compression of the resilient material by and between the nonextensible or rigid layers of the bearing. Physically, the strains in the resilient or elastomeric laminations are first apparent as bulging of material from between the nonextensible laminations. The bulging exposes the resilient material to frictional wear or fretting and, ultimately, results in large-scale extrusion from between the nonextensible laminations. The problem of excessive bulging or compression induced shear strain in a laminated resilient bearing has been recognized, and a solution proposed, in copending U.S. patent application Ser. No. 632,423, filed Nov. 17, 1975, now U.S. Pat. No. 4,040,690 which is assigned to the assignee of the present application.

The problem of fatigue failure due to compression induced shear strains may occur in a frustroconically shaped laminated bearing, just as in any other laminated bearing. It has been found, however, that the problem becomes more severe and appears at lower loads when certain steps are taken to reduce the size, and hence the weight, of a frustroconical laminated bearing. More particularly, one approach to reducing the space that must be provided to accommodate a frustroconically shaped laminated bearing is to reduce the outer circumference of the bearing. The outer circumference of the bearing can be reduced making each frustroconical lamination the same size, with the same maximum diameter or outer circumference. Such construction is to be contrasted with the alternative construction, which is to fabricate successive laminations with increasingly larger diameters so that each lamination is more fully nested in an adjacent lamination. The difference between the two construction techniques can be seen by comparing the frustroconically shaped bearing shown in FIG. 3 of Hinks U.S. Pat. No. 2,900,182 with the frustroconically shaped laminated bearing shown in FIG. 3 of Krotz U.S. Pat. No. 3,179,400 or in FIG. 2 of Galbato U.S. Pat. No. 3,503,820. As will be explained below, a frustroconical bearing fabricated of laminations all having the same maximum diameter is more likely and sooner likely to experience fatigue failure due to compression induced shear strains.

In the frustroconical bearing of Hinks U.S. Pat. No. 2,900,182, for example, the larger ends of the individual layers or laminations together define an annular surface of the bearing. The annular bearing surface is oriented normal or perpendicular to the frustroconically shaped side surfaces of the laminations. In the frustroconical laminated bearing of Krotz U.S. Pat. No. 3,179,400, on the other hand, the corresponding annular surface of the bearing forms an angle of about 30° to 50° with respect to the frustroconical side surfaces of the individual layers or laminations in the bearing. What could be regarded as an end surface of the Hinks bearing is essentially a side surface of the Krotz bearing. A frustroconically shaped laminated bearing that may incorporate a design or construction technique intermediate the designs or techniques found in the Hinks and Krotz bearings is shown in FIG. 4 of Cresap et al U.S. Pat. No. 3,652,185. The Cresap et al patent does not discuss the angular orientation between the side surfaces of its bearing layers and the annular surface defined by the larger diameter ends of the layers. Nonetheless, direct measurement of the patent drawings indicates an angle of about 75.5°. Stated another way, the surface of the bearing formed by the larger diameter ends of the laminations appears to be disposed, when viewed in radial section, at an angle of about 14.5° with respect to a line that is oriented normal to the frustroconical side surfaces of the layers or laminations in the bearing.

The adverse effects on the fatigue life of a frustroconical laminated bearing which result from efforts to reduce the overall size of the bearing were discovered during a program to design a bearing suitable for use in a helicopter rotor blade retention system similar to that shown in the Cresap et al patent. To reduce the outer circumference and overall size of the bearing, the surface of the bearing defined by the larger diameter ends of the laminations was "swept back" from an orientation normal to the side surfaces of the laminations in the bearing. A sample bearing was constructed in which the surface of the bearing defined by the larger diameter ends of the bearing laminations formed a "sweep angle" of approximately 30°, when viewed in radial section, with respect to a line normal to the frustroconical side surfaces of the layers or laminations in the bearing. Upon testing, the sample bearing with the 30° sweep angle failed prematurely and was not considered commercially acceptable in comparison to a similar frustroconically shaped laminated bearing in which the sweep angle was 0° (i.e., the surface defined by the larger diameter ends of the layers was oriented normal to the frustroconical side surfaces of the bearing layers or laminations). As a result, a frustroconical laminated bearing with a sweep angle of 0° was proposed for use in the blade retention system.

SUMMARY OF THE INVENTION

The present invention is directed to a frustroconical laminated bearing which has a sweep angle greater than 0° so as to provide a reduction in the size of the bearing, but which has an equivalent or longer service life in comparison to similar frustroconically shaped laminated bearings having a sweep angle of 0°. According to the invention, a laminated bearing comprises a plurality of alternating and bonded together layers of elastomeric material and substantially inextensible material. Each layer is a frustroconically shaped annulus which is concentrically disposed about a common axis extending lengthwise of the bearing and which has a pair of frustroconically shaped side surfaces. The layers are disposed relative to each other such that the larger diameter ends of the layers together define an annular surface of the bearing. To reduce the overall outer diameter or circumference of the bearing, the annular surface of the bearing formed by the larger ends of the layers defines, in radial section, a sweep angle greater than 0° with respect to a line oriented normal to a side surface of a layer. The direction of the angle or inclination, with respect to the normal line, is toward the smaller ends of the layers with increasing distance along the normal line away from the common axis of the bearing layers. Optimally, the sweep angle is about 9°.

Through an analysis of the effects of changing the sweep angle of a frustroconically shaped laminated elastomeric bearing, it has been found that a sweep angle within a general range of more than 0° but less than 20° will generally produce strains in the bearing not significantly greater than the strains found in a bearing that has a sweep angle of 0°. At the same time, the increase in the sweep angle from 0° results in an overall reduction in the outer diameter or circumference of the bearing. Moreover, it has been found that a sweep angle of about 9° actually reduces, to a significant extent, the compression induced shear strains produced in a frustroconical laminated bearing by a given compression load, in comparison to a sweep angle of 0°. Thus, the service life of a frustroconical bearing can actually be increased by increasing the sweep angle, in situations where compression induced shear strain is the governing parameter on service life.

BRIEF DESCRIPTION OF THE DRAWINGS

For a better understanding of the invention, reference may be made to the following description of an exemplary embodiment, taken in conjunction with the figures of the accompanying drawings, in which.

DESCRIPTION OF AN EMBODIMENT

Figure 1:
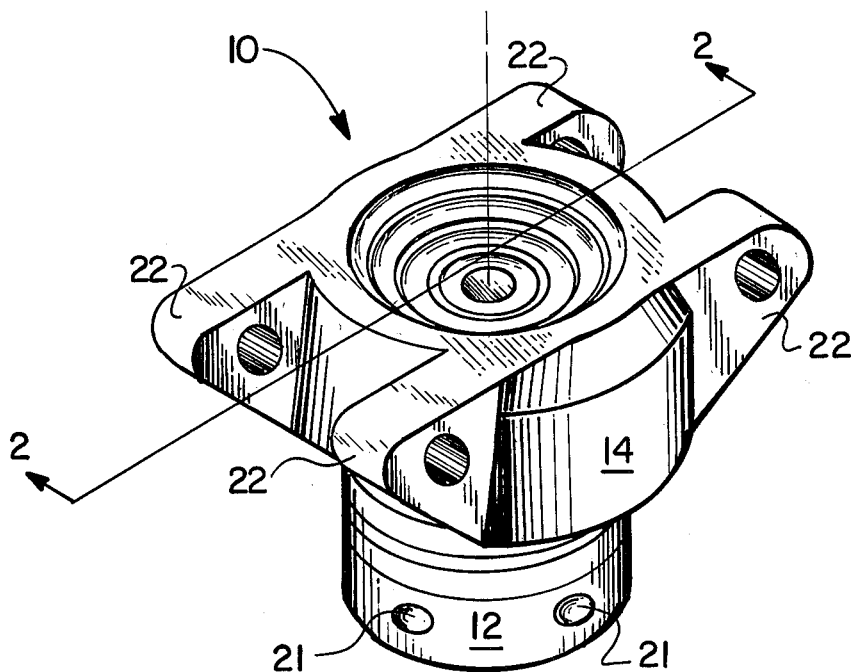
FIG. 1 is a perspective view of a frustroconically shaped laminated bearing according to the present invention.
Figure 2:
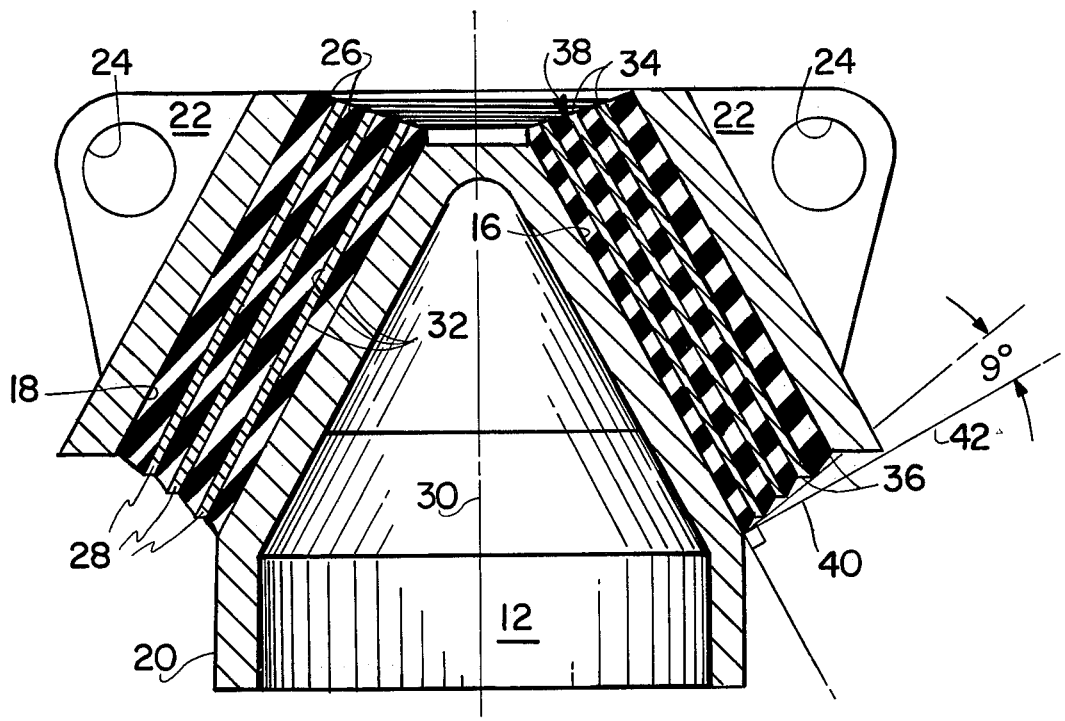
FIG. 2 is a sectional view of the bearing shown in FIG. 1, taken along line 2—2 of FIG. 1.

FIG. 1 of the drawings illustrates a laminated elastomeric bearing 10 that is suitable and intended for use in a retention system for a helicopter rotor blade (not shown). The bearing 10 includes inner and outer substantially inflexible members 12 and 14 that are spaced apart. As best shown in FIG. 2, the inner member 12 has an outer frustroconically shaped surface 16 that is presented to but spaced from a similarly shaped, parallel inner surface 18 of the outer member 14. The inner member 12 also has a cylindrically shaped extension 20, by which the bearing 10 may be connected to a bearing block (not shown), for example. Indentations 21 formed in the exterior surface of the extension 20 can be engaged by set screws or similar devices (not shown) to secure the bearing 10 to the bearing block (not shown). The outer member 14, which is in the shape of a truncated cone, has two pairs of parallel lugs or ears 22. The pairs of lugs 22 are located on opposite sides of the outer member 14 and are used to connect the bearing 10 to a yoke extension, for example, in a rotor blade retention system (not shown). A hole 24 extends through each of the lugs 22 so as to permit a bolt (not shown) to pass through aligned holes 24 in parallel lugs 22 and through a similarly aligned hole in a yoke extension (not shown).

Between the frustroconically shaped surfaces 16 and 18 of the inner and outer members 12 and 14 are a plurality of alternating and bonded together frustroconically shaped layers or laminations of elastomeric material and a substantially nonextensible material. In the bearing of FIG. 1, there are four elastomeric layers 26 and three layers of nonextensible material 28. The number of layers may be varied to suit the space and/or the functional (e.g., loading) requirements of a particular installation. The layers 26 and 28 alternate radially of an axis 30 that extends lengthwise through the center of the bearing 10. The elastomeric layers 26 are formed of natural rubber, while the layers of nonextensible material are formed of steel. Other elastomeric and nonextensible materials may be substituted for the rubber and steel where appropriate. Alternate elastomeric materials may include synthetic rubber, while alternate nonextensible materials may include other metals, fiberglass, reinforced plastic, and similar composite materials reinforced with high strength fibers.

Each of the layers or laminations 26 and 28 has a pair of frustroconically shaped side surfaces 32. Adjacent layers 26 and 28 are bonded to each other along mating side surfaces 32. The radially innermost and outermost elastomeric layers 26 are also bonded along one side surface 32 to the frustroconical surfaces 16 and 18 of the inner and outer members 12 and 14, respectively. In the illustrated embodiment of the bearing 10, the frustroconically shaped side surfaces 32 of each lamination 26 or 28 are parallel to each other so that each lamination has a uniform thickness throughout its length. Nonetheless, the thickness of each layer 26 or 28 could vary throughout its length, from one end to the other, as is done, for example, in the frustroconically shaped laminated bearing shown in FIG. 3 of Krotz U.S. Pat. No. 3,179,400.

In addition to the frustroconically shaped side surfaces 32, each layer or lamination 26 or 28 has, because of its frustroconical shape, a smaller diameter or circumference end 34 and a larger diameter or circumference end 36. Together, the larger diameter ends 36 of the laminations 26 and 28 define an annular, large diameter "base" surface 40 of the bearing 10. The smaller diameter ends 34 of the laminations 26 and 28 similarly define an annular, small diameter "top" surface 38 of the bearing 10. Depending upon the relative thicknesses of the laminations 26 and 28 and upon the relative proximity of each end 34 or 36 to an adjacent end 34 or 36, the surfaces 38 and 40 may appear relatively smooth or have readily apparent "steps" or "ridges" formed by the layers. The surfaces 38 and 40 may also exhibit a concavity or convexity of relatively minor extent.

Figure 3:
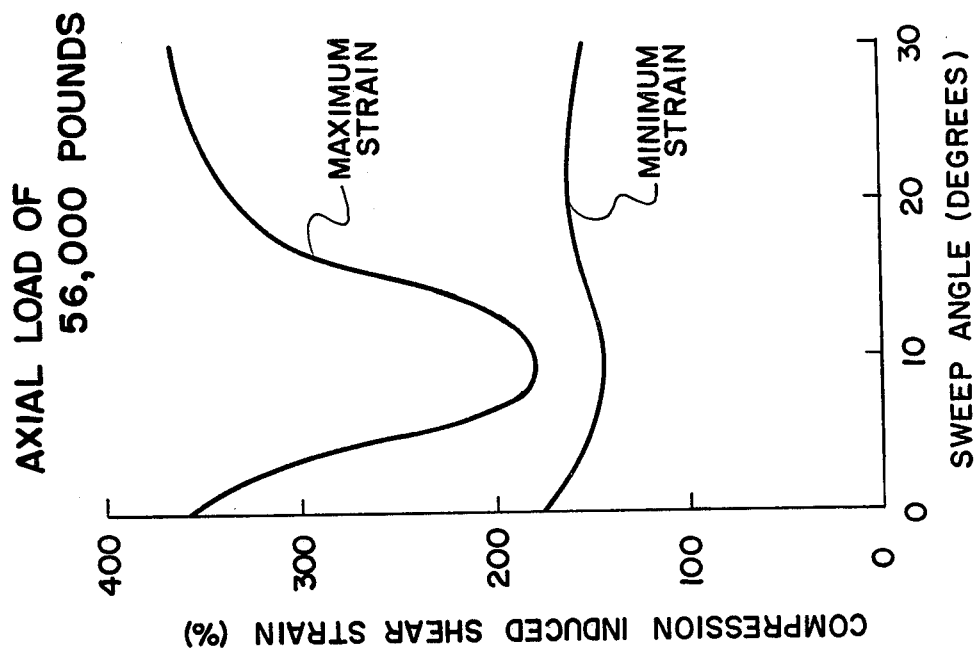
FIG. 3 is a graphical representation of the variation in compression induced shear strain in the elastomeric laminations of a frustroconically shaped laminated bearing with increasing sweep angle and a constant axially directed compression load.

In many frustroconically shaped laminated bearings generally similar in construction to the bearing of FIGS. 1 and 2 and currently in use, the surface that corresponds to the surface 40 in FIG. 2 is oriented substantially normal to the frustroconically shaped side surfaces 32 of the laminations 26 and 28. Thus, looking at FIG. 2 of the drawings, for example, the base surface of such a bearing would lie along the line 42 which is oriented normal or perpendicular to the side surfaces 32 of the laminations 26 and 28 and to the surfaces 16 and 18 of members 12 and 14, respectively. A frustroconical bearing that is so constructed is shown in FIG. 3 of Hinks U.S. Pat. No. 2,900,182. In the bearing of FIGS. 1 and 2, however, the base surface 40 of the bearing defines, in radial section, an angle of about 9° with respect to the normal line 42. As can be seen, the surface 40 is inclined, with respect to the line 42, in the direction of the smaller diameter ends 34 of the laminations 26 and 28 as one moves outward along the line 42 away from the axis 30. Although 9° is considered to be especially beneficial, the angle between the base surface 40 of the bearing 10 and the normal line 42, which hereafter will be referred to as the sweep angle, may be satisfactorily varied within a range more fully set out below.

As previously discussed, it has been found, through construction and testing of sample bearings similar to the bearing of FIGS. 1 and 2, that a sweep angle of 30° has a significant adverse effect on the service life of a frustroconical bearing, in comparison to a sweep angle of 0°. Analyses of the sample bearings, as well as of similar hypothetical, computer modeled bearings, have led to the discovery that while a large sweep angle produces undesirable stresses and strains in a frustroconically shaped laminated bearing, a more modest sweep angle can actually produce beneficial reductions in critical strains. The analyses in question were directed to compression induced shear strains experienced by elastomeric laminations in a bearing and to "hoop" stresses experienced by the substantially nonextensible laminations of a bearing. Compression induced shear strains, which have been defined previously, are physically embodied in bulging of the ends 34 and 36 of the elastomeric laminations 26 in the bearing 10 from between the non-extensible laminations 28. The importance of such strains in their effect on bearing fatigue or service life has only recently been recognized. Hoop stresses, which also result from placing compression loads on a bearing, may be considered as the result of subjecting the annular nonextensible laminations, all about their circumferences, to radially directed forces or loads that place each lamination in what may be termed "hoop tension".

FIGS. 3 to 6 of the drawings are graphical representations of the results of the analyses discussed above. For each of FIGS. 3 to 6 of the drawings, and for each data point within each Figure (i.e., sweep angles of 0°, 10°, 20°, and 30°), a substantially similar bearing was considered. Other design considerations did, however, require some structural variations (e.g., layer thicknesses and elastomer moduli of elasticity) from bearing to bearing in order to insure that each bearing considered could support the design loads, for example. Each bearing that was considered for FIGS. 3 to 6 was similar to the bearing shown in FIGS. 1 and 2 of the drawings. Each bearing included fifteen (15) laminations of elastomeric material and fourteen (14) laminations of nonextensible material. The included angle of each bearing was 60°. In other words, the angle between the central longitudinal axis 30 of each bearing, as shown in FIG. 2, and the frustroconical side surfaces of the laminations 26 and 28 (i.e., the cone angle) was 30°. In the situations depicted in FIGS. 3 and 5, the bearings were subjected to an axial compressive load (i.e., a load directed parallel to the central longitudinal axis 30 in FIG. 2) of 56,000 pounds and no radially directed load. In the situations depicted by FIGS. 4 and 6 of the drawings, each bearing was subjected to a radial load (i.e., a load directed normal to the central longitudinal axis 30 in FIG. 2) of 60,000 pounds and no axially directed load.

According to FIG. 3 of the drawings, as the sweep angle of a frustroconical bearing under an axial load is increased, the maximum compression induced shear strain experienced by any elastomeric lamination in the bearing reaches a minimum value when the bearing has a sweep angle of about 9.5°. The maximum compression induced shear strain in the bearing with a sweep angle of about 9.5° is also only about one-half of the maximum compression induced shear strain in the bearing with a sweep angle of 0°. Moreover, with a sweep angle of about 9.5°, the difference between the maximum compression induced shear strain experienced by any elastomeric lamination in the bearing and the minimum compression induced shear strain experienced by any lamination in the bearing is also at a minimum. Thus, there is a minimum variation between the effective utilization of the various elastomeric laminations in the bearing. Ideally, there should be no difference between the minimum and maximum compression induced shear strains experienced by the elastomeric laminations in the bearing. The absence of any variation between the minimum and maximum compression induced shear strains would indicate that all of the elastomer in the bearing is being worked or utilized to the same extent.

Figure 4:
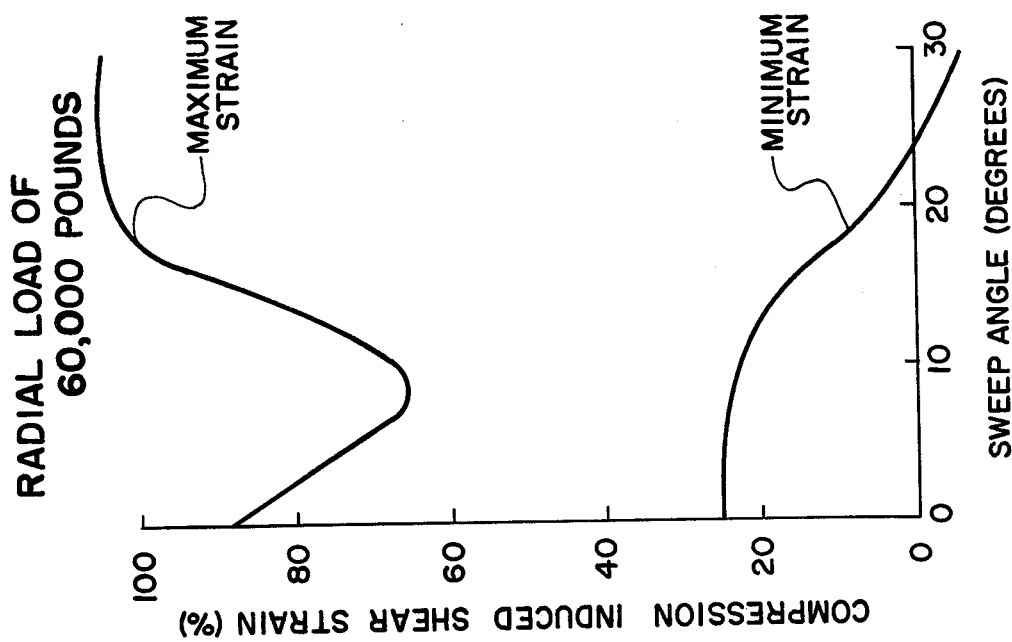
FIG. 4 is a graphical representation of the variation in compression induced shear strain with increasing sweep angle and a constant radially directed compression load.

FIG. 4 of the drawings shows that changes in the sweep angle of a frustroconical laminated bearing subjected to a radially directed load will produce a variation in the compression induced shear strain quite similar to the variation experienced when the bearing is subjected to an axial load. In FIG. 4, the maximum compression induced shear strain experienced by the elastomeric laminations in the bearing reaches a minimum value when the bearing has a sweep angle of about 8.5°. As in FIG. 3, a comparison between the maximum strain curve and the minimum strain curve indicates that the least difference between the maximum and minimum compression induced shear strains occurs when the bearing has a sweep angle of about 8.5°. As can be seen by comparing the scales for FIGS. 3 and 4, an axial load on a frustroconical laminated bearing will produce much higher strains than a radially directed load of approximately the same magnitude. Thus, it is the compression induced shear strains resulting from axially directed loads on a frustroconical laminated bearing which tend to have a more critical effect on the fatigue life of the bearing.

Figure 6:
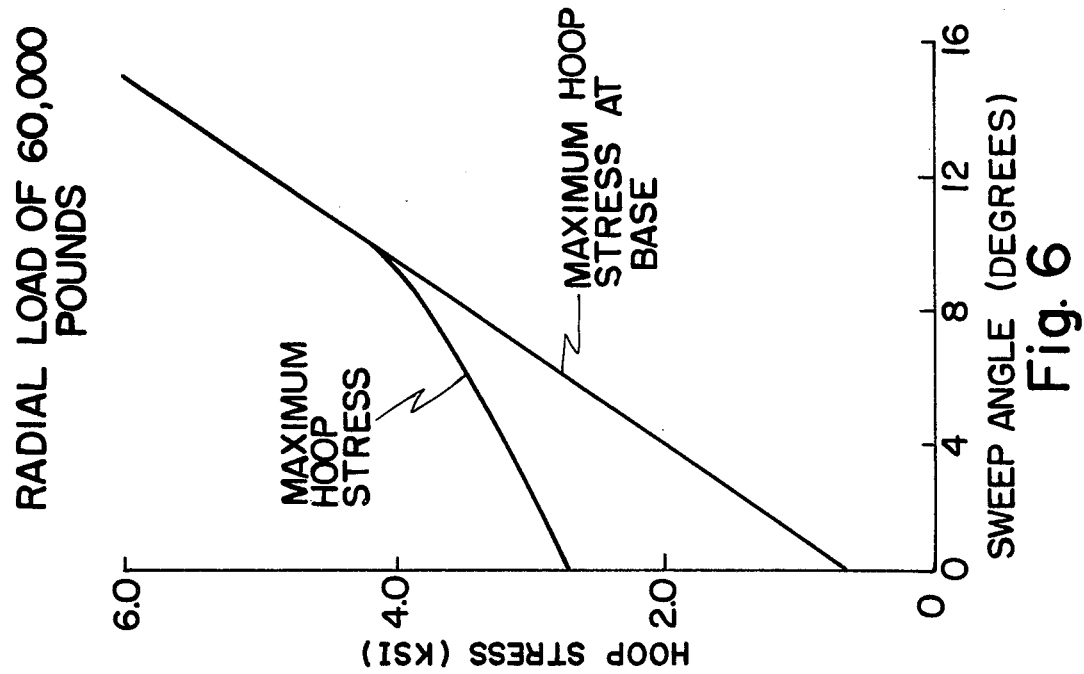
FIG. 6 is a graphical representation of the variation in hoop stresses with increasing sweep angle and a constant radially directed compressive load.
Figure 5:
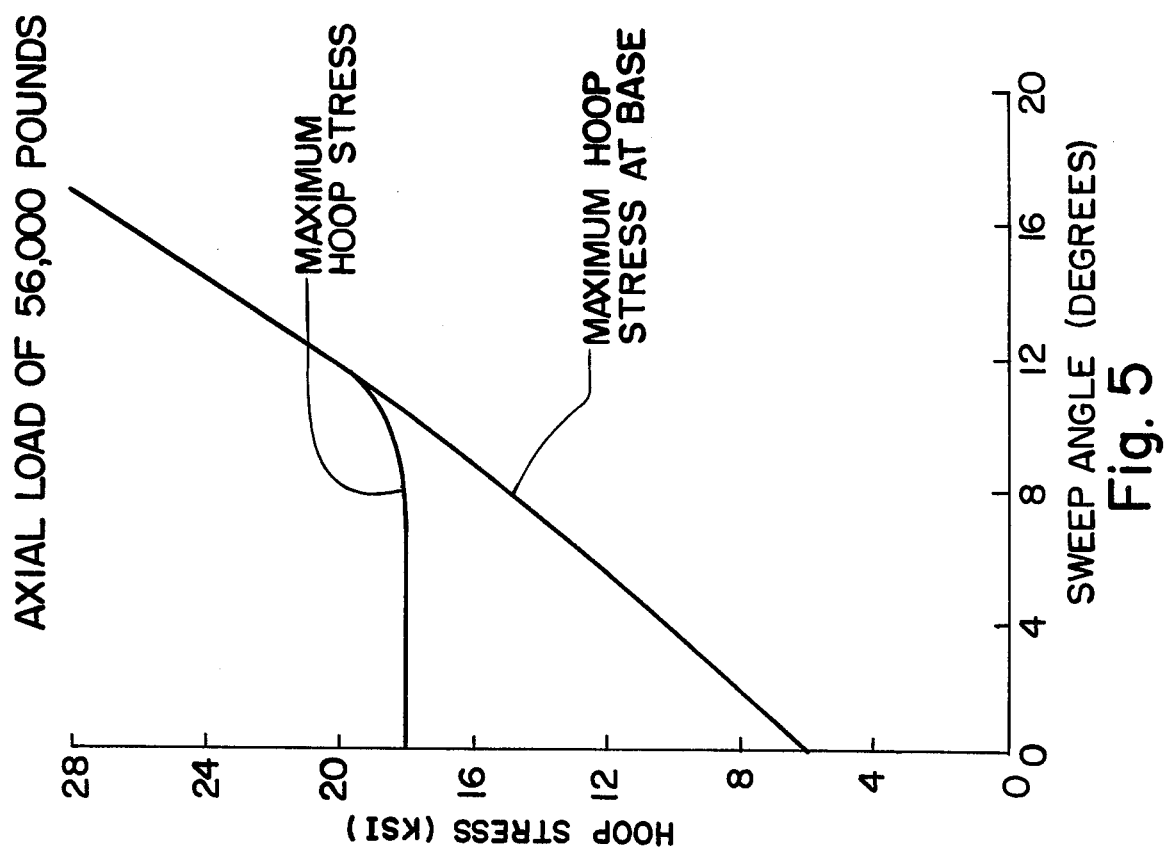
FIG. 5 is a graphical representation of the variation in hoop stresses in the nonextensible laminations of a frustroconically shaped laminated bearing with increasing sweep angle and a constant axially directed compressive load.

FIGS. 5 and 6 of the drawings show that a sweep angle of about 9° may also be regarded as critical to the hoop stresses experienced by the nonextensible laminations in a frustroconically shaped laminated bearing. Generally speaking, the hoop stresses experienced by the nonextensible laminations in a frustroconically shaped laminated elastomeric bearing are smallest adjacent the smaller diameter end of each lamination and are greatest adjacent the larger diameter or base end of each lamination. As shown in FIG. 5, however, the maximum hoop stress in any nonextensible lamination in a frustroconically shaped laminated bearing subjected to an axially directed compressive load (see the "Maximum Hoop Stress" curve) occurs at a point in some lamination which is displaced from the base end of that lamination, for a sweep angle of 0°. As the sweep angle of the bearing increases from 0° to about 10°, the maximum hoop stress experienced at the base of any lamination (but not necessarily each lamination) steadily increases (see the "Maximum Hoop Stress at Base" curve). On the other hand, the maximum hoop stress experienced anywhere in any of the nonextensible laminations remains relatively constant. When the bearing has a sweep angle of about 11°, the maximum hoop stress experienced at the base of any nonextensible lamination becomes the dominant or maximum hoop stress in the bearing. Thereafter, the maximum hoop stress experienced anywhere in any nonextensible lamination begins to increase, with increasing sweep angle, at a significant rate.

FIG. 6 of the drawings shows that a phenomenon similar to that shown in FIG. 5 occurs when a frustroconical bearing is subjected only to a radial load. According to FIG. 6, as the sweep angle of a bearing increases from 0° to about 10°, the maximum hoop stress experienced anywhere in any nonextensible lamination and the maximum hoop stress experienced at the base of any nonextensible lamination both increase. Although the maximum hoop stress anywhere is initially greater than the maximum hoop stress at the base of any nonextensible lamination, the maximum hoop stress at the base of any nonextensible lamination increases at a greater rate and becomes the dominant hoop stress at a sweep angle of about 10°. As the sweep angle increases above 10°, the maximum hoop stress anywhere increases at a significantly greater rate than the rate for sweep angles of from 0° to 10°. Again, as in FIGS. 3 and 4, the maximum hoop stresses resulting from an axially directed load are several times the maximum hoop stresses resulting from a radially directed load of approximately the same magnitude.

FIGS. 3 to 6 of the drawings tend to show that a sweep angle of about 9° is an optimal and critical sweep angle for a frustroconically shaped laminated elastomeric bearing. Depending upon the parameter being considered, the optimal sweep angle may actually be about 8.5° to about 11°. The language "about 9°" is intended to encompass a range of angles from about 8.5° to about 11°. In addition to identifying an optimal sweep angle of about 9°, FIGS. 3 and 4 also tend to show, at least with respect to compression induced shear strain, that any sweep angle greater than 0° and less than about 20° will produce strains no less favorable, and generally more favorable, than the strains produced by a sweep angle of 0°. In situations where compression induced shear strain is a critical factor or the dominant factor for determining bearing service life, a sweep angle of up to about 20° may be utilized to achieve bearing size reduction, without sacrificing service life in comparison to a bearing that has a sweep angle of 0°. It should be recognized, however, that the use of a sweep angle other than 0° may adversely affect other characteristics of a frustroconical laminated elastomeric bearing, such as torsional spring rate. In addition, variations in certain structural features of a frustroconical bearing, such as cone angle, may have an influence on the optimal sweep angle.

It will be understood that the embodiment described above is merely exemplary and that persons skilled in the art may make many variations and modifications without departing from the spirit and scope of the invention. For example, while reference has been made to a bearing in which the frustroconical side surfaces of the laminations are essentially parallel, the present invention is equally applicable to bearings in which the side surfaces of the laminations are not parallel but taper toward each other. In such a situation, the sweep angle would be determined from a hypothetical surface intermediate the two tapering side surfaces of a lamination or from a side surface oriented parallel to the frustroconical surface of the inner or outer member 12 or 14 of a bearing 10. All such modifications and variations are intended to be within the scope of the invention as defined in the appended claims.

What is claimed is:

1. A laminated bearing comprising a plurality of alternating and bonded together layers of elastomeric material and substantially inextensible material, each of the layers being a frustroconically shaped annulus that has a pair of frustroconical shaped side surfaces and is concentrically disposed about a common axis extending lengthwise of the bearing, the side surfaces of adjacent layers being juxtaposed with and bonded to each other such that the larger diameter end of each layer is disposed adjacent to the larger diameter end of another layer and said larger diameter ends of the layers together define an annular surface of the bearing, said annular surface of the bearing in radial section defining an angle of about 9° with respect to a line which is normal to a frustroconical side surface of a layer, the annular bearing surface being angled with respect to said normal line in a direction toward the smaller diameter ends of the layers with increasing distance along said normal line away from the common axis.

2. A laminated elastomeric bearing, according to claim 1, wherein the frustroconical side surfaces of the layers are disposed at an angle of about 30° with respect to the common axis.

3. A laminated elastomeric bearing comprising a plurality of alternating and bonded together layers of elastomeric material and substantially inextensible material, each of the layers being a frustroconically shaped annulus that has a pair of frustroconically shaped side surfaces and is concentrically disposed about a common axis extending lengthwise of the bearing, the side surfaces of adjacent layers being juxtaposed with and bonded to each other such that the larger diameter end of each layer is disposed adjacent to the larger diameter end of another layer and said larger diameter ends of the layers together define an annular surface of the bearing, said annular surface of the bearing in radial section defining an angle greater than 0° and less than 20° with respect to a line which is normal to a frustroconical side surface of a layer, the annular bearing surface being angled with respect to said normal line in a direction toward the smaller diameter ends of the layers with increasing distance along said normal line away from the common axis.

4. A laminated bearing, according to claim 3, wherein the frustroconical side surfaces of the layers are disposed at an angle of about 30° with respect to the common axis.

5. A laminated elastomeric bearing comprising a plurality of alternating and bonded together layers of elastomeric material and substantially inextensible material, each of the layers being a frustroconically shaped annulus that has a pair of frustroconically shaped side surfaces and is concentrically disposed about a common axis extending lengthwise of the bearing, the side surfaces of adjacent layers being juxtaposed with and bonded to each other such that the larger diameter end of each layer is disposed adjacent to the larger diameter end of another layer and said larger diameter ends of the layers together define an annular surface of the bearing, said annular surface of the bearing in radial section defining an angle greater than 0° and less than about 11° with respect to a line which is normal to a frustroconical side surface of a layer, the annular bearing surface being angled with respect to said normal line in a direction toward the smaller diameter ends of the layers with increasing distance along said normal line away from the common axis.

6. A laminated bearing, according to claim 5, wherein the frustroconical side surfaces of the layers are disposed at an angle of about 30° with respect to the common axis.

* * * * *